(12) United States Patent
Kittle et al.

(10) Patent No.: US 10,131,800 B2
(45) Date of Patent: Nov. 20, 2018

(54) INTUMESCENT COATING COMPOSITION

(71) Applicant: AKZO NOBEL COATINGS INTERNATIONAL B.V., Arnhem (NL)

(72) Inventors: Kevin Jeffrey Kittle, Durham (GB); Rachel Butler, Tyne and Wear (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 306 days.

(21) Appl. No.: 14/903,905

(22) PCT Filed: Jul. 11, 2014

(86) PCT No.: PCT/EP2014/064892
§ 371 (c)(1),
(2) Date: Jan. 8, 2016

(87) PCT Pub. No.: WO2015/007628
PCT Pub. Date: Jan. 22, 2015

(65) Prior Publication Data
US 2016/0145446 A1 May 26, 2016

(30) Foreign Application Priority Data
Jul. 16, 2013 (EP) .................... 13176655

(51) Int. Cl.
*C09D 5/18* (2006.01)
*C09D 163/00* (2006.01)

(52) U.S. Cl.
CPC .......... *C09D 5/185* (2013.01); *C09D 163/00* (2013.01)

(58) Field of Classification Search
CPC .................. C09D 163/00; C09D 5/185
USPC ............... 428/413; 427/421.1; 521/85
See application file for complete search history.

(56) References Cited

U.S. PATENT DOCUMENTS

| | | |
|---|---|---|
| 2,684,953 A | 7/1954 | Stilbert, Jr. et al. |
| 3,513,114 A | 5/1970 | Hahn et al. |
| 3,755,223 A | 8/1973 | Engel |
| 4,529,467 A | 7/1985 | Ward et al. |
| 4,725,457 A | 2/1988 | Ward et al. |
| 4,879,320 A | 11/1989 | Hastings |
| 5,070,119 A | 12/1991 | Nugent, Jr. et al. |
| 5,356,568 A | 10/1994 | Levine |
| 7,217,753 B2 | 5/2007 | Sinclair et al. |
| 8,372,899 B2 | 2/2013 | Kotzev et al. |
| 2005/0101696 A1* | 5/2005 | Sinclair ............... C09D 5/185 523/179 |
| 2006/0041042 A1 | 2/2006 | Thewes |
| 2014/0005298 A1 | 1/2014 | Thewes |

FOREIGN PATENT DOCUMENTS

| | | |
|---|---|---|
| CN | 1876740 A | 12/2006 |
| CN | 102766391 A | 11/2012 |
| CN | 102993905 B | 2/2016 |
| EP | 0 568 354 A1 | 11/1993 |
| EP | 1 449 895 A2 | 8/2004 |
| EP | 1377644 B1 | 11/2006 |
| GB | 2 269 548 A | 2/1994 |
| RU | 2011 122 488 A | 12/2012 |
| WO | 96/03854 A2 | 2/1996 |
| WO | 98/12270 A1 | 3/1998 |
| WO | 01/05886 A1 | 1/2001 |
| WO | 01/70889 A2 | 9/2001 |
| WO | 06/067478 A1 | 6/2006 |
| WO | 2007/050000 A1 | 5/2007 |
| WO | 2010/054984 A1 | 5/2010 |

OTHER PUBLICATIONS

Ullah et al., "Effect of Boric Acid and Melamine on the Intumescent Fire-Retardant Coating Composition for the Fire Protection of Structural Steel Substrates", Journal of Applied Polymer Science, 2013, particular relevance: pp. 2983-2993.

* cited by examiner

*Primary Examiner* — William K Cheung
(74) *Attorney, Agent, or Firm* — McDonnell Boehnen Hulbert & Berghoff LLP

(57) ABSTRACT

The present invention relates to a thermosetting intumescent coating composition which is suitable for protecting substrates against hydrocarbon fires, for example jet fires. The coating composition can be used without a supporting mesh. The present invention also relates to substrates coated with the intumescent coating composition, and a method of protecting structures from fire.

7 Claims, No Drawings

INTUMESCENT COATING COMPOSITION

REFERENCE TO RELATED APPLICATIONS

This application is the U.S. National Phase of PCT/EP2014/064892, filed on Jul. 11, 2014, which is incorporated herein by reference it its entirety, and which claims the benefit of EP Application No. 13176655.2, filed on Jul. 16, 2013.

The present invention relates to a liquid intumescent composition, substrates coated with said composition, and a method of protecting structures from fire. The char formed from a coating of the present invention has excellent strength and thermal insulation properties. Consequently, the intumescent coating composition has utility in protecting structures, such as offshore installations, against a turbulent hydrocarbon fire.

The use of steel framework as a method of building construction is commonplace. Much of the world's steel production goes into building construction. Steel framed buildings offer many advantages over traditional methods of construction but suffer a major disadvantage, namely that in the event of fire the temperature of unprotected steel quickly increases to a point where the steel "softens", loses its rigidity and this compromises the integrity of the structure. With time, the building will collapse but long before this happens the flexing of the structure will cause paneling, cladding etc, that may be connected to the steel framework, to break loose posing a significant hazard to people trying to evacuate the building and to fire fighters trying to contain the fire.

The simplest way to try to overcome the above mentioned disadvantage of a steel framework is in some way to insulate the steel. The degree of insulation affects the time taken to reach the point when the structure becomes unstable and various ratings are arrived at using official tests.

Intumescent coatings are used on many structures to delay the heating effects of a fire. The coating slows the rate of temperature increase of the substrate to which the coating is applied. The coating thus increases the time before the structure fails due to the heat of fire. The extra time makes it more likely that fire fighters will be able to extinguish the fire or at least apply cooling water before the structure fails. To intumesce means to swell and to char. When exposed to heat/fire, an intumescent coating forms a thick, porous highly insulative, non-flammable, solid foam barrier on the surface that it covers.

The major benefit of these intumescent materials over the various other options available is that under normal conditions they take up virtually no space (typical coating thicknesses are in the region of 5 mm) and they add negligible additional weight to the structure. Intumescent coatings have been available commercially for many years. The majority of intumescent coatings require a primer coat, one of more layers of intumescent material in order to build up the required thickness of material, and a finishing coat to improve weatherability. There is a need for intumescent coatings which produce harder coatings which are less easily damaged.

Conventional intumescent coatings comprising a polymeric binder typically also comprise the following components which enable the coating to intumesce upon exposure to heat/fire: a source of acid, a charring agent and a blowing agent.

When the conventional intumescent coating is exposed to fire or excessive heat, the source of acid decomposes to provide an acid. The charring or char forming agent (also known as a carbonific) reacts with the acid to form a carbonaceous char. Examples of char forming agents include, for example, polyhydric alcohols such as pentaerythritol or dipentaerythritol or mixtures thereof. The carbonaceous char is obtained on decomposition of the polyhydric alcohol. The blowing agent produces a non-flammable gas (e.g. ammonia) when subjected to heat or flame. Commonly used blowing agents are amine-functional and include urea, dicyandiamide, melamine and melamine derivatives. The gas evolved from the blowing agent serves to make an expanded carbonaceous char/foam.

Intumescent coatings should be distinguished from fire retardant coatings. The purpose of a fire retardant or a flame retardant coating is to reduce the flammability and delay the combustion of the substrate which it coats. It is not necessary or essential for a pure fire retardant to intumesce. Consequently, fire retardant coatings often have a very different composition to traditional intumescent coatings. For example, fire retardant coatings sometimes contain high amounts of materials (certain fillers and pigments) which are for preventing the passage of flames, but these materials also inhibit the coating from intumescing.

Intumescent coatings are often categorized according to the type of fire they are designed to provide protection against. For example, some intumescent coatings are designed to provide protection against cellulosic fires, others are designed to provide protection against hydrocarbon fires.

By cellulosic fire protection, we mean coatings that are formulated to protect elements of structure from a cellulosic fire exposure. A cellulosic fire is one characterised by a fuel source such as wood, paper, textiles, etc. These fuels are typical of modern day commercial and infrastructure projects in the Built Environment, usually for architectural applications in the Built Environment including internal and externally exposed structural steelwork. The cellulosic standard fire test curve reaches 500° within about 5 minutes and rises to in excess of 1100° C. [2012° F.] over time.

By hydrocarbon fire protection we mean coatings that have been specifically formulated to protect steel structural elements from hydrocarbon fire exposure. Hydrocarbon fires, or pool fires, are fires that burn above a pool of vaporizing hydrocarbon fuel. Hydrocarbon fires have been found to be extremely turbulent and have a very rapid heat rise to about 1000° C. within 5 minutes, with a rise to 1100° C. shortly thereafter. A pool fire can compromise the structural integrity of typical steel work used in oil and gas facilities in a matter of minutes. Jet fires are a particular group of hydrocarbon fuelled fires resulting from the combustion of fuel that is continuously released under high pressure (2 bar or greater). Jet fires represent a significant risk for offshore installations due to the high heat fluxes and erosive forces that they produce.

Intumescent coatings that protect against hydrocarbon fire must be stronger, more hardwearing, have better weather resistance than intumescent coatings that protect against cellulosic fires. Further, intumescent coatings that protect against hydrocarbon fire must be capable of forming a very strong char with good structural integrity and adhesion to the substrate so that it does not fall apart or away from the substrate when exposed to the high heat fluxes and extreme erosive forces of a hydrocarbon fire. In some instances, if an intumescent coating produces char foam with inadequate strength (so it cannot protect against the turbulent forces of a hydrocarbon fire), various additives such as fibres, silica, glass reinforcing materials might be added to the intumescent coating composition with the aim of increasing the strength of the char. However, the use of a too high an amount of additives in conventional intumescent coating compositions, reduces the amount the coating swells when exposed to excessive heat/fire, resulting in a compromise in it's thermal protection.

In other instances, if an intumescent coating produces a char foam with inadequate thermal insulation, further blowing agent, most typically an amine-functional blowing agent such as urea, dicyandiamide, melamine and melamine derivatives is added. The purpose of adding extra blowing agent is to increase the amount of gas that is produced during the intumescent process so that a more expanded, lower density and higher insulating foam is formed. Usually however, a highly expanded foam has poor strength and adhesion.

To summarize the above, (i) intumescent coatings producing good strong and compact chars which are robust enough to resist the extreme erosive forces of a hydrocarbon fire, often have a poor ability to thermally insulate the substrate which they coat, and (ii) intumescent coatings which produce highly expanded chars with good thermal protection, the chars are not strong enough to resist the extreme erosive forces of a hydrocarbon fire. A known solution to providing a coating system which provides strength, adhesion and good thermal insulation is to provide a coating system comprising two coating layers as described in WO96/03854. The coating system of WO96/03854 comprises a first coating layer which forms a rigid carbonific char foam having a toughness and density, and the second coating layer forms an insulative carbonific char foam having a density about half the density of the char foam of the first coating layer. The first layer is to protect the substrate from break-through and direct exposure to the fire conditions (i.e. strength) and the second layer is to provide insulation. WO96/03854 however fails to teach how to provide both strength and insulation using a single coating composition.

There is a need for an (one) intumescent coating composition that results in a coating which when exposed to heat produces a char having both excellent strength and providing excellent thermal protection, to the extent that it is suitable for use in turbulent hydrocarbon fires.

Provided herein is an intumescent coating composition, which when cured and then exposed to heat, intumesces to form a non-flammable barrier which is both strong and has good fire performance (thermal insulation properties) to the extent that it is suitable for protecting against hydrocarbon fires.

The coating composition provides a durable strong, hard-wearing, and weather (water/corrosion) resistant film with good adhesion, even without fibres or glass reinforcing materials.

Advantageously since the coating composition of the present invention is a liquid, the coating composition is easy to apply by conventional methods such as by airless spray, pouring, trowelling and brushing. The coating composition may also be formulated with little or no solvent. The volatile organic content (VOC) of the coating compositions of the present invention can be less than 250 g/L. The VOC of the coating composition may be less than 100 g/L, or even less than 50 g/L.

A further advantage is that the coating composition when cured, has good adhesion to the substrate to the extent that it may be used without a reinforcing mesh.

The liquid intumescent coating composition of the present invention comprises (a) 25.0-75.0 volume % of one more organic thermosetting polymer(s) and curing agent(s) for the organic thermosetting polymer(s);
(b) 5.0-70.0 volume % of one or more source(s) of phosphoric acid and/or sulphonic acid;
(c) 1.0-60.0 volume % of one or more source(s) of metal and/or metalloid ion(s) selected from oxides, hydroxides, carbonates, bicarbonates phosphates, chlorides, sulphates, nitrates, silicates, and borates of Al, Ti, Al, Zn, Cu, Zr, Mg, Na or Ca; and oxides, hydroxides, carbonates of Si and B; and complexes thereof;
(d) 0.0-5.0 volume % of amine functional blowing agents selected urea, dicyandiamide, melamine and derivatives thereof, provided that the total volume of said amine functional blowing agents is no greater than 25% of the volume of (c).

Unless otherwise stated herein, all volume % (Vol %) values stated herein are calculated on the total volume of the non-volatile components in the coating composition at room temperature (25° C.). The volume of each component may be calculated with knowledge of the mass and specific density of the component.

The non-volatile components in the coating composition are the components that are present in the coating after the coating composition has cured. For the purpose of this invention, as a general rule, non-volatile components have a boiling point of more than 150° C. at 1 atmospheric pressure. A solvent in the coating composition, which is not present in the coating film, is not a non-volatile component.

Preferably the coating composition is a liquid ambient temperature curable coating composition. A liquid ambient temperature curable coating composition is a liquid coating composition that is capable of being cured in ambient conditions/temperature, e.g. −5 to 50° C. (@ 50% Relative Humidity, "RH"). If the coating composition is an ambient temperature curable coating composition, then the curing agent comprises functional groups capable of reacting with the functional groups of the organic thermosetting polymer at ambient temperature. When the intumescent coating of the present invention is exposed to heat, gases (e.g. ammonia, carbon dioxide and water) are produced from a reaction between the acid source and the organic polymer. By exposure to heat, preferably we mean exposure to temperatures of around 150° C. and higher (e.g. 250° C.), typically in a fire. These gases act as a blowing agent to foam the carbonaceous char.

The char formed by the coating of the present invention has better strength and thermal insulation properties compared to chars formed from coatings having the same composition but comprising greater amounts of the amine-functional blowing agents, urea, dicyandiamide, melamine and derivatives thereof. This is surprising particularly since urea, dicyandiamide, melamine and derivatives thereof are the most commonly used blowing agents used in the industry, and an increase in the amount of such blowing agents would normally have been expected to improve at least the insulation properties of the char.

Nevertheless, the inventors found that improved properties with respect to both strength and thermal insulation of the char are achieved by restricting the amount of these amine-functional blowing agents in the composition. The reason these amine-functional blowing agents have a detrimental effect on the properties of the char is unknown.

Further the inventors also found that the addition of other further blowing agents, did not improve these physical properties of the intumescent coating.

A preferred intumescent coating composition of the present invention therefore comprises a total of 0-5.0 volume % of said amine functional blowing agents (d) and other blowing agents (e) wherein said other blowing agents (e) are selected from expandable graphite, THEIC, sulfamic acid, boric acid and borate salts such as sodium borate and tunastanate salts such as sodium tungstanate and derivatives thereof.

Another preferred intumescent coating composition comprises a total of 0-5.0 volume % of said blowing agents (d) and (e), and any further components (f) that are capable of imparting a blowing function to a cured coating.

Even more unexpectedly, the inventors found that the use of a relatively high amount of metal/metalloid ions in the coating composition in relation to the amount of blowing agent does not prevent the structure from intumescing but surprisingly the char formed from such a composition provides excellent thermal protection (insulation) to the coated substrate and the char is unexpectedly strong/hard.

WO01/05886, U.S. Pat. No. 3,513,114 and WO 2006/067478 disclose thermoplastic coating compositions, preferably comprising a (preferably amine-functional) blowing agent. The Examples in all these disclosures exemplify compositions comprising about equal amounts of amine-functional blowing agent (melamine or dicyandiamine) and sources of metal/metalloid ions (e.g. $TiO_2$). The coating composition of the invention however requires an organic thermosetting polymer, and a lower amount of blowing agent relative to the amount of the source of metal ions/metalloid. Improving properties in char strength and thermal insulation by decreasing the amount of the amine-functional blowing agent relative to the amount of metal ions in a thermosetting polymer containing coating composition, is not suggested in any of these disclosures.

EP 1377644 discloses fire retardant intumescent powder coating compositions which do not have to comprise a separate carbonific or blowing agent such as melamine. EP 1377644 explains the reason for doing away with the carbonific or blowing agent is to increase the binder system content of the coating composition. Increasing the binder system content ensures that the powder coating composition, when applied and melted will coalesce properly to form a coherent coating on the substrate. The teaching to reduce and remove the carbonific and blowing agent in EP 1377644 is therefore specific to powder coating compositions and is not relevant to liquid coating compositions.

The liquid coating composition of the present invention has a number of advantages over the powder coating compositions including that they can be applied to large surfaces by conventional techniques such as spraying or troweling. Powder coatings, by virtue of the fact they must be cured in an oven, are only suitable for coating smaller surfaces. Further, the liquid coating composition of the invention can be formulated so that it is curable at ambient temperature, whereas powder coating compositions require heat to cure.

The one or more thermosetting polymer(s) and curing agent(s) for the organic thermosetting polymer(s) are not particularly limited.

The thermosetting polymer(s) of (a) may comprise at least one of the following functional groups: epoxy, amine, ester, vinyl, vinyl ester, amide, urethane, mercaptan, carboxylic acid, acryloyl, methacryloyl, isocyanate, alkoxysilyl, anhydride, hydroxyl, alkoxy and polythiol groups. In a fire/heat, these organic groups react with the acid generated from the acid source to impart charring and blowing functions to the intumescent coating.

For example, (a) may comprise an organic thermosetting polymer selected from an epoxy resin, an organopolysiloxane resin, or a combination thereof, and a curing agent selected from an amine, thiol, carboxylic acid, anhydride and/or alcohol functional curing agent.

Suitably, (a) comprises an epoxy functional resin and an amine functional curing agent.

Suitably, (b) is selected from ammonium polyphosphate (APP) or para-toluene sulphonic acid.

Suitably (c) may be selected from one or more oxides, hydroxides, carbonates, bicarbonates phosphates, chlorides, sulphates, nitrates, silicates, and borates of Al, Ti, Al, Zn, Cu, Zr, Mg, Na or Ca, and complexes thereof.

Further, (c) may be selected from one or more of $TiO_2$, ZnO, $ZnPO_4$, $Al(OH)_3$, $Al_2O_3$, $AlPO_4$, Kaolin, MgO, $MgPO_4$ or $ZrO_2$.

For example, the volume % of one or more source(s) of metal and/or metalloid ion(s) (c) may range from 5.0 to 12.0 Vol %.

In a specific case, for example, (a) may comprise an epoxy functional resin and an amine functional curing agent, (b) may be a source of phosphoric acid, and (c) may be one or more of the following: $TiO_2$, ZnO, ZnPO4, Al(OH)3, Al2O3, AlPO4, Kaolin, MgO, MgPO4, or $ZrO_2$.

The coating composition preferably comprises 0 vol % of urea, melamine or derivatives thereof (d). The coating preferably comprises 0 Vol % of (d) and (e).

Preferably, the total volume of (d) is no greater than 5.0% of the volume of (c).

Suitably, the intumescent coating composition comprises a total of 0-5.0 volume % of said blowing agents (d) and (e) and any further components (f) that are capable of imparting a blowing function to a cured coating.

Preferably, the total volume of (d)+(e) or (d)+(e)+(f) is no greater than 5.0% of the volume of (c).

Also within the scope of the present invention is a substrate coated with the coating compositions as described herein, and a method of protecting structures from fire by coating (applying to) the structure, a coating composition as described herein, and allowing the coating composition to cure, preferably at ambient temperature (e.g. −5-50° C.).

Organic Thermosetting Polymer and Curing Agent (a)

The coating composition of the present invention comprises an organic thermosetting polymer and curing agent for the organic thermosetting polymer. The one or more thermosetting polymer(s) and curing agent(s) for the organic thermosetting polymer(s) is not particularly limited.

The organic thermosetting polymer and curing agent are capable of reacting/curing to form a coating layer. Since the coating composition comprises a source of acid and a source of metal ions, the cured coating layer would also comprise a source of acid and the source of metal ions.

The organic thermosetting polymer has an organic nature. By organic nature, we mean that the polymer system contains carbon. By definition therefore, the organic polymer may not comprise purely polymeric or oligomeric inorganic silicate structures, e.g. sodium or potassium silicate. Coatings wherein the binder is solely an alkali silicate would be water leachable and would not provide a hardwearing/weather (water/corrosion) resistant film suitable for protecting against hydrocarbon fires.

The organic thermosetting polymer(s) may however contain heteroatoms, and may for example, contain alkoxysilyl-functional groups. The organic thermosetting polymer may comprise an organopolysiloxane for example, a polysiloxane with organic pendent groups, for example, C1-C10 alkyl (methyl, ethyl, phenyl), amino and epoxy groups.

Since the organic thermosetting polymer contains carbon, an additional charring agent is not an essential component in the coating composition.

The organic thermosetting polymer maybe one or a mixture of more than one different organic thermosetting polymers.

The organic thermosetting polymer may comprise one or more of the following functional groups: epoxy, amine, ester, vinyl, vinyl ester, amide, urethane, mercaptan, carboxylic acid, acryloyl, methacyloyl, isocyanate, alkoxysilyl, anhydride, hydroxyl, alkoxy and polythiol groups.

An organic thermosetting polymer suitable for use in this composition may be an: epoxy-functional resin.

Typically, the epoxy resin has a number average molecular weight Mn in the range of from 300 to about 6,000, preferably 300-3,000.

Suitable epoxy-functional resins include (i) polyglycidyl ethers derived from such polyhydric alcohols as ethyleneglycol, diethyleneglycol, triethyleneglycol, 1,2-propyleneglycol, 1,4-butyleneglycol, 1,5-pentanediol, 1,2,6-hexanetriol, glycerol, thrimethylolpropane, bisphenol-A (a condensation product of acetone and phenol), bisphenol-F (a condensation product of phenol and formaldehyde), hydrogenated bisphenol-A, or hydrogenated bisphenol-F, (ii) polyglycidyl ethers of polycarboxylic acids, formed by the reaction of an epoxy compound such as epichlorohydrin with an aliphatic or aromatic polycarboxylic acid such as oxalic acid, succinic acid, glutaric acid, terephthalic acid, 2,6-napthalene dicarboxylic acid, or dimerised linoleic acid, (iii) epoxidised olefinically unsaturated alicyclic materials such as epoxy alicyclic ethers and esters, (iv) epoxy resins containing oxyalkylene groups, (v) epoxy novolac resins, which are prepared by reacting an epihalohydrin (e.g. epichlorohydrin) with the condensation product of an aldehyde with a monohydric or polyhydric phenol (e.g. phenol-formaldehyde condensate), and (vi) mixtures thereof.

The epoxy-functional resin preferably has an epoxy equivalent weight in the range of 100 to 5,000, more preferably 160-1,000 g/eq.

Other suitable resins include vinyl ester resins for example, (meth)acrylate resins, vinyl-functional resins, for example vinyl-functional polysiloxanes and unsaturated polyesters, polyurethanes, alkyds, and alkoxysilyl-functional organic resins, or combinations thereof. Commercially obtainable epoxy resins, include for example DER 331™ (Dow Chemicals) and Epikote 828™ (Momentive Performance Chemicals).

The intumescent coating compositions of the present invention based on organic thermosetting polymers, not only produce strong chars with excellent thermal protection, the coatings themselves may also have a good film strength, weather and corrosion resistance in comparison to if thermoplastic polymer(s) are used. Further, it is possible to formulate the coating compositions of the present invention with thermosetting polymers having a low volatile organic content (VOC), for example less than 250 g/L, preferably less than 100 g/L, and most preferably less than 50 g/L. The volatile organic content (VOC) may be determined in accordance with the method of ISO11890-2. If the coating composition is supplied in the form of a 2-pack composition, the VOC values refer to the volatile content of both packs when mixed in the correct ratio. In contrast, thermoplastic polymers are generally formulated with comparatively more solvent, since the evaporation of the solvent is required to affect hardening of the coating film. Having a lower VOC is not only advantageous because of the lower environmental impact, but it is also understood by the inventors to improve mechanical properties and reduce the flammability of the coating film. Not wishing to be bound by theory, the inventors surmise that this is because the use of less solvent reduces the likelihood of solvent becoming trapped in the coating film as the film hardens. Trapped organic solvent in the coating can negatively affect the mechanical properties of the coating film and also increase it's flammability. In addition, a low VOC allows application of the coating composition at high thicknesses without the solvent retention issues of a solvent based paint.

The intumescent coating composition also comprises a curing agent for curing the organic thermosetting polymer. The choice of curing agent is not particularly limited, except that it must comprise functional groups that are capable of reacting with the functional groups of the organic thermosetting polymer in order to affect cross-linking. Determination of a suitable curing agent is within the general skill set and knowledge of a skilled person who formulates coating compositions.

For example, if the organic thermosetting polymer is an epoxy resin, suitable curing agent could comprise the following functional groups: amines (e.g. primary amine, secondary amine, and tertiary amine/imidazole type curing agents), thiols, carboxylic acids, anhydrides and alcohols such a phenols. Suitable examples are phenol resin curing agents, polyamine curing agents, polythiol curing agents, polyanhydride curing agents, and polycarboxylic acid curing agents.

Examples of phenol resin curing agents are phenol novolac resin, bisphenol novolac resin, and poly p-vinylphenol.

Examples of polyamine curing agents are diethylene triamine, triethylene tetramine, tetraethylene pentamine, dicyandiamide, polyamido-amine, polyamide resin, ketimine compounds, isophorone diamine, m-xylene diamine, m-phenylene diamine, 1,3-bis(aminomethyl)cyclohexane, bis(4-aminocyclohexyl) methane, N-aminoethyl piperazine, 4,4'-diaminodiphenyl methane, 4,4'-diamino-3,3'-diethyl-diphenyl methane, and diaminodiphenyl sulfone, phenalkamine, mannich bases. Commercial grade quality curing agents of any of these polyamines may be used. Adducts of any of these amines can also be used. Such adducts can be prepared by reaction of the amine with a suitably reactive compound such as an epoxy resin. This will reduce the free amine content of the curing agent, making it more suitable for use under conditions of low temperature and/or high humidity.

Examples of polycarboxylic acid curing agents include phthalic anhydride, tetrahydrophthalic anhydride, methyltetrahydrophthalic anhydride, 3,6-endomethylenetetrahydrophthalic anhydride, hexachloroendomethylenetetra-hydrophthalic anhydride, and methyl-3,6-endomethylenetetrahydrophthalic anhydride.

In one embodiment, (a) is an epoxy resin and an amine-functional curing agent. Advantageously, this embodiment is curable in ambient conditions (e.g. from −5 to 50° C. at 50% RH).

A curing agent is usually used in an amount so that the stoichiometry of reactive groups on the curing agent to reactive group on the organic thermosetting resin is 0.4 to 1.5:1, preferably 0.5-1.3:1. For example, if the organic thermosetting polymer is an epoxy resin, and the curing agent is amine-functional, the stoichiometry of active hydrogen on the amine-functional curing agent to epoxy on the epoxy resin is 0.4 to 1.5:1, preferably 0.6-1.2:1.

The coating composition according to all embodiments of the present invention comprises from 25.0 to 75.0 vol %, preferably from 25.0 to 60.0 vol %, even more preferably from 25.0 to 50.0 vol % and most preferably 25.0 to 40.0 vol % of the organic thermosetting polymer and curing agent for the organic thermosetting polymer.

Source of Phosphoric Acid or Sulphonic Acid (b)

The source of phosphoric acid or sulphonic acid is one or more components(s) that produces phosphoric acid or sulphonic acid upon exposure to heat. By exposure to heat, typically this means exposure to temperatures of around 150° C. and higher, usually in the event of a fire.

Examples of such sources include sodium, potassium or ammonium salts of phosphoric or sulphonic acid, e.g. ammonium polyphosphate (APP) monoammonium phosphate, diammonium phosphate, potassium phosphate (such as potassium tripolyphosphate), sodium phosphate, paratoluene sulphonic, acid, ammonium sulphate, potassium sulphate and sodium sulphate. Preferred sources include ammonium polyphosphate (APP) and para-toluene sulphonic acid.

Suitably, (b) is a source of phosphoric acid. A preferred source of acid is ammonium polyphosphate, which is commercially obtainable as Exolit AP422™ from Clariant.

When a coating produced from the coating composition of the present invention is exposed to heat, typically in a fire, acid is produced from the acid source. The acid generated from the acid source reacts with the polymer. This reaction imparts charring and blowing functions to the intumescent coating.

The coating composition comprises from 5.0 to 70.0 vol % of the source of acid. Preferably, the volume of the source of acid ranges from 10.0 to 60.0 vol %, from 20.0 to 50.0 vol %, from 30.0 to 50.0 vol %, most preferably from 35.0 to 45.0 vol %.

For the avoidance of doubt, the volume % of the source of acid is the volume of the entire source of acid (i.e. volume of ammonium polyphosphate), and not the volume of the acid which is produced by the source (i.e. not the volume of the phosphoric acid).

Source of Metal Ions and/or Metalloid Ions (c)

The intumescent coating composition comprises from 1.0-60.0 volume % of one or more source(s) of metal and/or metalloid ion(s) selected from oxides, hydroxides, carbonates, bicarbonates phosphates, chlorides, sulphates, nitrates, silicates, and borates of Al, Ti, Al, Zn, Cu, Zr, Mg, Na or Ca; and oxides, hydroxides, carbonates of Si and B; and complexes thereof. Al, Ti, Al, Zn, Cu, Zr, Mg, Na or Ca are metals. Si and B are metalloid ions.

Preferably, the volume of the source of metal/metalloid ions ranges from 1.0 to 50.0 vol %, from 1.0 to 40.0 vol %, from 1.0 to 30.0 vol %, 5.0-60.0 vol %, 5.0 to 50.0 vol %, from 5.0 to 40.0 vol %, from 5.0 to 30.0 vol %, from 5.0 to 20.0 vol % for example from 5.0 to 12.0 vol %.

If $TiO_2$ is present in the intumescent coating composition, the $TiO_2$ may be present in an amount of greater than 8.0 Vol %.

Metal oxides and metalloid oxides are compounds in which metal/metalloid atoms are bonded to oxygen. Simple metal oxides have only one type of metal ion, which bonds to an oxide ion ($O^{2-}$) in proportion to balance the charges on the metal ion. Simple metalloid oxides have only one type of metalloid ion, which bonds to an oxide ion ($O^{2-}$) in proportion to balance the charges on the metalloid ion. For example, the copper ion $Cu^+$, the magnesium ion $Mg^{2+}$, the aluminium ion $Al^{3+}$ and the silicon ion $Si^{4+}$ combine with the Oxide ion $O^{2-}$ ion to form $Cu_2O$ (Cuprite), MgO (Periclase), $Al_2O_3$ (Corundum) and $SiO_2$ (Silica). Mixed metal oxides comprise more than one type of metal ion, examples being $MgAl_2O_4$ (Spinel) and $FeTiO_3$ (Ilmenite).

Suitable sources of metal oxides, which can be used alone or in combination in the compositions of the present invention are: $Al_2O_3$, $TiO_2$, ZnO, $ZrO_2$, $SiO_2$, MgO, aluminium silicate (sometimes referred to as Kaolin), and china clay. A suitable source of metalloid oxide includes silica ($SiO_2$).

Metal hydroxides comprise metal-hydroxy bonds and metalloid hydroxides comprise metalloid-hydroxy bonds. Metal and metalloid hydroxides sometimes also comprise metal/metalloid-oxygen bonds.

Simple metal/metalloid hydroxides contain one type of metal or metalloid ion which is bonded to a hydroxide ion ($OH^-$) and optionally also an oxide ion ($O^{2-}$), in proportion to balance the changes on the metal/metalloid ion. Mixed metal/metalloid hydroxides contain more than one type of metal and/or metalloid ion, the metal/metalloid ions being bonded to a hydroxide ions ($OH^-$) and optionally also an oxide ions ($O^{2-}$), in proportion to balance the changes on the metal ions.

A particularly suitable metal hydroxide for use in the present invention is $Al(OH)_3$.

Metal carbonates, metal bicarbonates, metal phosphates, metal chlorides, metal sulphates, metal nitrates and metal borates are compounds in which metal atoms are bonded to carbonate, bicarbonate, chloride, sulphate, nitrate and borate ions respectively. In these compounds, the metal ions are bonded to the above-listed functional ions in proportion to balance the charges on the metal ion. They may contain one or more different types of metal ions. These compounds are known to the person skilled in the art. For example, sources of metal phosphates include $AlPO_4$, and $MgPO_4$.

A source of metal/metalloid atoms may also be a complex comprising metal/metalloid ions bonded more than one of the following counter ions: oxide, hydroxide, carbonate, bicarbonate, chloride, sulphate, nitrate and borate ions.

Preferred sources of metals ions, for use in the present invention includes one or more of $TiO_2$, ZnO, $ZnPO_4$, $Al(OH)_3$, $Al_2O_3$, $AlPO_4$, Kaolin (alumino silicate), MgO, $MgPO_4$, $ZrO_2$.

For the avoidance of doubt, the volume % of the source of metal/metalloid ions is the volume of the entire source of metal/metalloid ions (i.e. volume of $TiO_2$), and not the volume of the metal ion(s) derived from the source (i.e. not the volume of Ti).

Amine Functional Blowing Agents Selected from Urea, Dicyandiamide, Melamine and Derivatives Thereof (d)

The coating composition may comprises amine functional blowing agents selected from urea ($CO(NH_2)_2$), dicyandiamide ($NC-NH-C(NH)NH_2$), melamine and derivatives thereof up to a maximum volume % of 5.0 vol %, provided that the total volume of said amine functional blowing agents is no greater than 25.0% of the volume of (c). Preferably the total volume of said amine functional blowing agents (d) is no greater than 5.0% of the volume of (c).

Melamine has the following chemical structure:

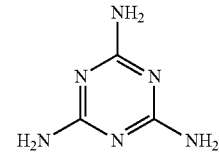

Melamine derivatives are known in the art. Melamine derivatives may be, for example, a salt of melamine (e.g. melamine cyanurate) or comprise the same structure as shown above except at least one of the hydrogens on the amino groups attached to the aromatic ring is substituted with an optionally substituted alkyl, alkenyl or aryl group. Melamine derivatives include for example, melamine cyanurate, melamine (mono)phosphate, di-melamine phosphate, melamine bi-phosphate, melamine polyphosphate, melamine pyrophosphate, Melam (1,3,5-triazine-2,4,6-triamine-n-(4,6-diamino-1,3,5-triazine-2-yl), Melem (-2,5,8-triamino 1,3,4,6,7,9,9b-Heptaazaphenalene), Melon (poly[8-amino-1,3,4,6,7,9,9b-Heptaazaphenalene-2,5-diyl)imino, methylolated melamine, hexamethoxymethyl melamine.

Examples of urea derivatives are also known in the art and include, for example, N-alkylureas such as methyl urea, N,N'-dialkylureas such as dimethylurea, and N,N,N'-trialkylureas such as trimethylurea, guanylurea, formamide amineo urea, guanylurea phosphate, 1,3-diamino urea, biurea and the like. It has been found that amine-functional blowing agents, and in particular urea, dicyandiamide, melamine and derivatives thereof, in the coating composition, has a detrimental effect on the strength and thermal insulation properties of the char. The present inventors therefore seek to reduce or preferably eliminate the need for an amine-functional blowing agents selected from urea, dicyandiamide, melamine and derivatives thereof in the coating composition.

Preferably the coating composition contains no or substantially no (i.e. 0 Vol %) amine-functional blowing agents selected from urea, dicyandiamide, melamine and derivatives thereof.

Other Blowing Agents (e)

Suitably, the intumescent coating composition comprises a total of 0-5.0 volume % of said amine functional blowing agents (d) and other blowing agents (e) wherein said other blowing agents (e) are selected from expandable graphite, THEIC (tris-(2-Hydroxyethyl) isocyanurate), sulfamic acid, boric acid and borate salts (such as sodium borate) and tunastanate salts (such as sodium tungstanate).

The total of volume of said amine functional blowing agents (d) and other blowing agents (e) should be no greater than 25.0% of the volume of (c). Preferably the total volume of said amine functional blowing agents (d) and other blowing agents (e) is no greater than 5.0% of the volume of (c).

Further Components that are Capable of Imparting a Blowing Function to a Cured Coating (f)

Suitably, the intumescent coating composition comprises a total of 0-5.0 volume % of said blowing agents (d) and (e) and any further components (f) that are capable of imparting a blowing function to a cured coating.

The further components that are capable of imparting a blowing function to the cured coating (f), impart the blowing function when the cured coating is exposed to heat (usually around 250° C., typically when the cured coating is exposed to a fire).

The total of volume of blowing agents (d), (e) and (f) should be no greater than 25.0% of the volume of (c). Preferably the total volume of said amine functional blowing agents (d), (e) and (f) is no greater than 5.0% of the volume of (c).

Examples of other blowing agents (f) include, for example, other amine-functional blowing agents, for example, ammonium sulfamate and ammonium bromide, biurets, guanidine, glycine and derivatives or mixtures thereof.

Carbonific Agents

The organic thermosetting polymer when in a cured coating and exposed to heat (fire) acts as a carbonific by reacting with acid to form a carbonaceous char. Further carbonific agents are therefore not essential, but may be included in the intumescent coating composition if desired. Examples of suitable additional carbon sources are pentaerythritol, dipentaerythritol, polyvinyl alcohol, starch, cellulose powder, hydrocarbon resins, chloroparaffins, and phosphated plasticisers.

Accelerators

The intumescent coating composition may also comprise accelerators known to speed up the curing reaction between an epoxy resin and the curing agent.

Examples of accelerators known to speed up the curing reaction between an epoxy resin and the curing agent include the following alcohols, phenols, carboxylic acids, sulphonic acids, and salts:

Alcohols: Ethanol, 1-propanol, 2-propanol, 1-butanol, 2-butanol, t-butanol, benzyl alcohol, furfuryl alcohol, and other alkyl alcohols, propanediol, butanediol, glycerol and other polyhydric alcohols, triethanolamine, tri-isopropanolamine, dimethylaminoethanol and other hydroxy tertiary amines.

Phenols: Phenol, 2-chlorophenol, 4-chlorophenol, 2,4-dichlorophenol, 2,4,6-trichlorophenol, 2-nitrophenol, 4-nitrophenol, 2,4-dinitrophenol, 2,4,6-trinitrophenol, 2,4,6-Tri-(dimethylaminomethyl)-phenol, 4-cyanophenol, o-cresol, m-cresol, p-cresol, 4-ethylphenol, 4-isopropylphenol, 2,4-dimethylphenol, 3,5-dimethylphenol, nonyl phenol, eugenol, isoeugenol, cardanol and other alkylated phenols, 2,2'-dihydroxybiphenyl, 2,4'-dihydroxybiphenyl, 4,4'-dihydroxybiphenol, bisphenol A, bisphenol F, catechol, 4-t-butyl catechol, resorcinol, 4-hexylresorcinol, orcinol, hydroquinone, naphthalenediol, anthracenediol, biphenylenediol and other substituted dihydric phenols, phloroglucinol, phloroglucide, calixarene, poly(4-vinylphenol) and other polyhydric phenols.

Carboxylic acids: acetic acid, propanoic acid, butyric acid, lactic acid, phenyl acetic acid and other alkyl carboxylic acids, malonic acid, oxalic acid, maleic acid, fumaric acid and other dibasic acids or their monoesters, benzoic acid, 4-t-butyl benzoic acid, salicylic acid, 3,5-dichlorosalicylic acid, 4-nitrobenzoic acid and other aromatic acids.

Sulphonic acids: Methanesulphonic acid and other alkyl sulphonic acid, p-toluenesulphonic acid, 4-dodecylbenzenesulphonic acid, and other aromatic sulphonic acids, naphthalene disulphonic acid, di-nonyl naphthalene disulphonic acid and other polyhydric sulphonic acids.

Other Optional Ingredients

The intumescent coating composition of the invention may also contain other components, for example one or more solvents, diluents, additives to modify the melt viscosity (such as hydrogenated castor oil), colouring agents (such as carbon black), fibres (e.g. ceramic fibre, glass fibre, carbon fibre, silica fibre filler), rheology modifiers, plasticisers, pigment dispersants, stabilisers, mould releasing agents, surface modifiers, flame retardants, antibacterial agents, antimoulds, low density fillers, endothermic fillers, char promoters, fluxing aids, and levelling agents.

If fibres are in the coating composition, it is preferred that they fulfil certain criteria with respect to dimensions. Fibres, if used, are preferably rod-shaped, in the sense that they have one longer "length" dimension and two "width" dimensions which are perpendicular to the length. The fibres generally have a ratio between the average length and the average width of at least 5, at least 10, for example at least 50.

Fibres may be added to the coating composition during it's manufacture or mixed with the coating composition before application.

Such fibres may have an average "length", of between 150 µm to 8 mm and an average "width" of 1-50 µm.

For example, the average length may be between 150 µm to 7 mm, for example 3 mm to 7 mm. The term "average" when used in connection with length and width indicates that a certain variation of the length of fibres exists within the distribution of the fibres used. Average should be understood as the mean number-average. The fibre length and width may be measured by optical image analysis using the MorFi System (MorFi Analyzer).

Inorganic fibres may be present in the coating composition. Examples of inorganic fibres include carbide fibres, such as silicon carbide fibres, boron carbide fibres, niobium carbide fibres; nitride fibres, such as silicon nitride fibres; boron containing fibres, such as boron fibres, boride fibres; silicon-containing fibres, such as silicon fibres, alumina-boron-silica fibres, E-glass (non-alkaline alumoborosilicate) fibres, C-glass (non-alkaline or low-alkaline soda lime-alumoborosilicate) fibres, A-glass (alkaline soda lime-silicate) fibres, S-glass fibres, CEMFIL-glass fibres, ARG-glass fibres, mineral-glass fibres, non-alkaline magnesia alumosilicate fibres, quartz fibres, silicic acid fibres, silica fibres, high-silica fibres, alumina high-silica fibres, alumosilicate fibres, aluminium silicate fibres, magnesia alumosilicate fibres, soda borosilicate fibres, soda silicate fibres, polycarbosilane fibres, polytitanocarbosilane fibres, polysilazane fibres, hydridopolysilazane fibres, tobermorite fibres, samarium silicate fibres, wollastonite fibres, potassium aluminium silicate fibres; metal fibres, such as iron fibres, aluminium fibres, steel fibres, iron fibres, zinc fibres; carbon fibres, such as pure carbon fibres, graphite fibres, slagwool fibres, charcoal fibres; rockwool fibres, such as pure rockwool fibres and basalt rockwool fibres; processed mineral fibres from mineral wool; volcanic rock fibres; attapulgite fibres; etc.; modified by any chemical or physical processes; and any mixture thereof.

Preferred fibres are glass fibres, for example, E-glass fibres, C-glass fibres, A-glass fibres, S-glass fibres, CEMFIL-glass fibres, ARG-glass fibres, and mineral-glass fibres, which may optionally be coated or modified by any known process.

Fibres, for example glass fibres, may be present in the coating composition up to 10 vol %. As mentioned above, the average length may be between 150 µm to 7 mm, for example 3 mm to 7 mm.

Blends of fibres may be used.

Alternatively, the composition according to the present invention substantially does not contain fibres. For example, the coating composition of the present invention may comprise up to a maximum of 1.5 weight % of fibres to the total weight of all the components in the coating composition excluding solvent.

Examples of diluents include (meth)acrylate resins and (meth)acrylate-functional resins such as urethane acrylates, acrylate esters derived from an epoxy resin, polyether acrylates, polyester acrylates, polyamide acrylate, acrylic polymers having pendant acrylic groups, and silicone acrylates.

Application

The coating composition of the present invention can be applied directly to surface to be protected (i.e. as a primer/finish) or over a primer coating layer. The coating composition is a liquid when it is applied. The coating composition is typically applied at temperatures between −10 and 60° C. The coating composition must therefore be a liquid between −10 and 60° C. The liquid coating composition of the present invention may be applied by conventional methods, for example by airless spray, by pouring (used in molds), brushing or troweling.

Typically, the viscosity of the liquid coating composition between −10 and 60° C. is suitable to allow effective atomisation and droplet formation under the high shear conditions associated with plural component airless spray application techniques. The liquid coating composition may be preheated up to temperatures of 60° C. in the airless spray equipment to reduce the viscosity of the liquid coating composition.

The intumescent coating composition is may be supplied in two or more packs, in which case the curing agent is supplied in a different package to the organic thermosetting polymer. For example, the coating composition may comprise a first pack comprising the thermosetting polymer(s) and a second pack comprising the curing agent(s) for the thermosetting polymer(s). The first pack and the second pack are mixed together prior to application on the substrate.

The coating composition may be applied on various substrates. It is particularly suitable to be applied on metal substrates, for example, steel and aluminium substrates, and composite materials, for example glass reinforced plastic (GRP). Due to the combination of excellent strength and thermal protection afforded by the char, the intumescent coating may protect structures from hydrocarbon fires, such as jet fires. The coating composition of the invention therefore may be applied in zones where there is a jet-fire risk (such as such as offshore installations, oil and gas installations).

When applied to a substrate, the dry film thickness of the layer of intumescent coating is typically between 0.1 mm and 40 mm, for example 1.0 mm and 30 mm, or 2.0 mm and 30 mm. The dry film thickness may be measured using an Elcometer 355 Coating Thickness Gauge.

For the avoidance of doubt, the features provided in the above description can be combined in any order.

The invention will now be elucidated with reference to the following examples. These are intended to illustrate the invention but are not to be construed as limiting in any manner the scope thereof.

EXAMPLES

Test Methods

Thermal Fire Protection Testing (Time to Failure)

The relative fire protection capability of each coating was determined by the cone calorimeter thermal technique, which is a laboratory based technique cited in several peer reviewed academic papers. (Bartholmai, M; Schartel, B; FRPM '05, BAM, Berlin, Germany 7-9 Sep. 2005)

The technique uses a heating cone (diameter 160 mm) providing a heat flux of 50 KW/M$^2$ to simulate a fire. A thermocouple is taped to the non coated side of the panel and then the panel is placed in a sample holder which leaves the painted surface open to the cone heater. The thermocouple is attached to a Grant 2020 series squirrel data logger to read the evolution of temperature as the coated side is heated. The sample is placed at a distance of 25 mm from the edge of the cone. The Time To Failure of the sample is taken as the time it takes for the thermocouple to register a back face temperature of 400° C.

Char Strength Testing

The relative strengths of each of the chars produced by the cone calorimeter thermal test were tested using a Mecmesin AFG 100N force meter. The char is allowed to cool to ambient temperature and then placed under a force gauge plunger (diameter 20 mm). A stepper motor is used to provide a constant force to the plunger. The plunger is driven into the char until it reaches the half height of the char and the resistance to the force is measured. The higher the resistance of the char to the force of the plunger, the harder the char and the greater the structural integrity (and the greater the N-value).

Intumescence Factor Testing

The dry film thickness of the cured paint was measured using an Elcometer 355 Coating Thickness Gauge. The final char height is measured using a Hydracone Depth Gauge. The intumescence factor is calculated as the ratio of the char height:initial dry film thickness.

Sample Preparation of Compositions 1-6

Compositions 1 to 6 comprising the components shown in Table 1 were made by first mixing all components except for the curing agent into the resin base by high speed dispermat. The polyamido amine curing agent was then added and each test coating composition was applied to grit blasted, primed steel panel (100×100×4 mm) to a thickness of 1 mm using a drawdown applicator. The coatings were allowed to cure at ambient temperature for 24 hours before testing according to the procedures noted above.

TABLE 1

Showing the Volume % of each component in Compositions 1-6

| Component | Coating Composition No # | | | | | |
|---|---|---|---|---|---|---|
| | 1* | 2* | 3* | 4* | 5* | 6 |
| Epoxy Resin, D.E.R. 331 (DOW) (epoxy resin) | 23.5 | 23.2 | 22.3 | 21.7 | 19.9 | 23.5 |
| Trimethylypropane triacrylate (diluent) | 4.5 | 4.5 | 4.3 | 4.2 | 3.8 | 4.5 |
| Ammonium Polyphosphate (source of acid) | 40.0 | 39.6 | 38.1 | 37.0 | 33.9 | 41.7 |
| Melamine (blowing agent) | 10.0 | 9.9 | 9.5 | 9.3 | 16.9 | 0 |
| Zinc Oxide (source of metal ions) | 0.0 | 1.0 | 4.8 | 7.4 | 6.8 | 8.3 |
| Polyamido amine Curing Agent having an amine equivalent weight of 93 g/mol | 19.9 | 19.7 | 19.0 | 18.5 | 16.9 | 19.9 |
| 2,4,6-tri(dimethylaminomethyl)phenol (accelerator) | 2.1 | 2.1 | 2.0 | 1.9 | 1.8 | 2.1 |
| Ratio of epoxy functional groups:NH functional groups | 0.6:1 | 0.6:1 | 0.6:1 | 0.6:1 | 0.6:1 | 0.6:1 |
| Volume of melamine/volume of ZnO (%) | ∞ | 990% | 204% | 126% | 249% | 0% |

*Comparative Examples

Results of Testing Compositions 1-6

TABLE 2

Test Results

| Composition | Time to Failure (min) | Char Strength (N) |
|---|---|---|
| 1 | 21 | <1 |
| 2 | 29 | <1 |
| 3 | 23 | 5 |
| 4 | 9 | ¥ |
| 5 | 9 | ¥ |
| 6 | 24 | 28 |

¥ Could not be measured as the char was too compact

Composition 1 provides a standard epoxy amine intumescent with no metal oxide addition which acts as a standard/control system. This has a reasonable Time to Failure (thermal performance) but poor char strength (N).

The Time to Failure and char strength of Composition 2 shows that the addition of metal oxides at low concentration (~1 wt %) improves the thermal performance of the char but the char strength is not significantly enhanced by the low levels of metal oxide.

In order to increase char strength, more metal oxide was added to the composition (composition 3). The results however show that the additional metal oxide, also reduced the thermal protection. The addition of more metal oxide as in composition 4 shows that the thermal protection is made even worse.

The current accepted knowledge of intumescent fire protection equates thermal protection with increasing the amount of intumescence. It is also intuitive that the means to generate intumescence is by adding more blowing agent. Surprisingly however Composition 5 shows that the addition of melamine to composition 4 leads to no improvement in thermal performance.

It is therefore surprising to note the result of Composition 6 in which the removal of all melamine blowing agent gives rise to both (i) an improvement in thermal protection and (ii) a significantly harder char strength (to the extent that the coating is capable of providing intumescent protection against hydrocarbon fires).

Advantageously, Composition 6 has 0% VOC. This, of course, would not be possible if a thermoplastic polymer had been used, as thermoplastic polymers require solvent when formulated which evaporates when the coating dries.

Sample Preparation of Composition 7

Composition 7 comprising the components shown in Table 3 were made by first mixing all components except for the curing agent into the resin base by high speed dispermat. The polyamido amine curing agent was then added and the intumescent coating composition was applied to grit blasted, primed steel panel (100×100×4 mm) to a thickness of 1 mm using a drawdown applicator. The coating composition was allowed to cure at ambient temperature for 24 hours before testing.

The intumescence factor and char strength of coating prepared from composition 7 and a commercially available epoxy amine based intumescent coating composition containing melamine (Standard) were determined.

TABLE 3

| Component | Coating Composition No 7 |
|---|---|
| Epoxy Resin, D.E.R. 331 (DOW) (epoxy resin) | 23.7 |
| Trimethylypropane triacrylate (diluent) | 4.6 |
| Ammonium Polyphosphate (source of acid) | 40 |
| Melamine (blowing agent) | 0 |
| $TiO_2$ (source of metal ions) | 10 |
| Polyamido amine Curing Agent having an amine equivalent weight of 93 g/mol | 19.6 |
| 2,4,6-Tri(dimethylaminomethyl)-phenol (accelerator) | 2.1 |
| Ratio of epoxy functional groups:NH functional groups | 0.6:1 |
| Volume of melamine/volume of $TiO_2$ (%) | 0% |

TABLE 4

Test Results

| Composition | Intumescence Factor | Char Strength (N) |
|---|---|---|
| 7 | 12 | >65 |
| Standard | 12 | 1.5 |

The test results of Table 4 show that a coating formed from a coating composition according to the invention, had a good intumescence factor (same as the Standard Commercial coating comprising melamine) however a significantly better char strength.

The invention claimed is:
1. A liquid ambient temperature curable intumescent coating composition comprising:
   (a) 25.0-75.0 volume % of one or more organic thermosetting polymer(s) and curing agent(s) for the organic thermosetting polymer(s),
   (b) 5.0-50.0 volume % of one or more source(s) of phosphoric acid and/or sulphonic acid,
   (c) 5.0 to 30.0 volume % of one or more source(s) of metal and/or metalloid ion(s) selected from oxides, hydroxides, carbonates, bicarbonates, phosphates, chlorides, sulphates, nitrates, silicates, and borates of Al, Ti, Zn, Cu, Zr, Mg, Na or Ca; and oxides, hydroxides, and carbonates of Si or B; and complexes thereof,
   a total of 0.0-5.0 volume % of amine functional blowing agents (d) selected from urea, dicyandiamide, melamine and derivatives thereof and other blowing agents (e), wherein said other blowing agents (e) are selected from expandable graphite, THEIC, sulfamic acid, boric acid, borate salts, tunastanate salts, and derivatives thereof, provided that the total volume of said amine functional blowing agents (d) and said other blowing agents (e) is no greater than 5% of the volume of (c),
wherein (b) is selected from ammonium polyphosphate (APP) or para-toluene sulphonic acid,
wherein (c) is selected from one or more of $TiO_2$, ZnO, $ZnPO_4$, $Al(OH)_3$, $Al_2O_3$, $AlPO_4$, Kaolin, MgO, $MgPO_4$ or $ZrO_2$,
wherein volume % is calculated on the total volume of the non-volatile components in the coating composition.

2. The liquid ambient temperature curable intumescent coating composition of claim 1, wherein (a) comprises an organic thermosetting polymer comprising at least one of the following functional groups: epoxy, amine, ester, vinyl, vinyl ester, amide, urethane, mercaptan, carboxylic acid, acryloyl, methacryloyl, isocyanate, alkoxysilyl, anhydride, hydroxyl, alkoxy or polythiol groups.

3. The liquid ambient temperature curable intumescent coating composition of claim 1, wherein (a) comprises an organic thermosetting polymer selected from an epoxy resin, an organopolysiloxane resin, or a combination thereof, and a curing agent selected from an amine, a thiol, a carboxylic acid, an anhydride and/or an alcohol functional curing agent.

4. The liquid ambient temperature curable intumescent coating composition of claim 1, wherein the organic thermosetting polymer of (a) comprises an epoxy functional resin and an amine functional curing agent.

5. The liquid ambient temperature curable intumescent coating composition of claim 1, wherein the volume % of (c) ranges from 5.0 to 12.0 vol %.

6. A substrate coated with the liquid ambient temperature curable intumescent coating composition of claim 1.

7. A method of protecting structures from fire, the method comprising coating the structure with the liquid ambient temperature curable intumescent coating composition of claim 1, and allowing the coating composition to cure at ambient temperature.

* * * * *